United States Patent Office 3,485,641
Patented Dec. 23, 1969

3,485,641
DOUGH FLAVOR CONCENTRATE
Robert H. Bundus, Riverside, and Anthony J. Luksas, Chicago, Ill., assignors to Beatrice Foods Co., Chicago, Ill., a corporation of Delaware
No Drawing. Continuation-in-part of application Ser. No. 697,320, Jan. 12, 1968. This application July 8, 1968, Ser. No. 742,999
Int. Cl. A23l 1/26
U.S. Cl. 99—140  9 Claims

ABSTRACT OF THE DISCLOSURE

Preparation of a synthetic bread flavor by heating whey until the protein is coagulated out and removed. The clear solution is divided into fractions A and B. Fraction A is diluted with water from 1:4 to 1:20. Fraction B is concentrated to $\frac{1}{5}$ to $\frac{1}{12}$ the volume and the crystallized lactose removed. Fraction B is then diluted with either water or Solution A and is inoculated with bread flavor forming organisms to form bread flavor.

---

This application is a continuation-in-part of application Ser. No. 567,371, filed July 25, 1966 and application Ser. No. 697,320 filed Jan. 12, 1968. The entire disclosures of the parent applications are hereby incorporated by reference.

The parent applications relate to the preparation of a bread flavor concentrate.

It is an object of the present invention to develop an improved process for preparing such a bread flavor concentrate.

Another object is to develop an improved process of spray drying bread flavor concentrate.

Still further object and the entire scope of applicability of the present invention will become apparent from the detailed description given hereinafter; it should be understood, however, that the detailed description and specific examples, while indicating preferred embodiments of the invention, are given by way of illustration only, since various changes and modifications within the spirit and scope of the invention will become apparent to those skilled in the art from this detailed description.

It has now been found that these objects can be attained by procedures more fully described below.

Whey is heated in conventional fashion, e.g. at 185° F. (20 minutes) to 300° F. (15 seconds) until all the protein is coagulated. The whey is then centrifuged or filtered to remove the protein. While the preferred whey is cottage cheese whey, and this was used in the specific examples below there can also be used whey obtained in the manufacture of cheddar cheese, Swiss cheese, Neufchatel cheese or cream cheese, for example.

The clear solution is divided into two fractions. Fraction A is diluted with water to give a dilution of 1:4 to 1:20, preferably 1:20. The resulting product is designated Solution A.

Fraction B is concentrated to $\frac{1}{5}$ to $\frac{1}{12}$, preferably $\frac{1}{10}$ its volume. The concentration can be carried out at room temperature and pressure or by heating at atmospheric pressure, e.g. up to 212° F. However, preferably Fraction B is concentrated by heating in a vacuum at 90–140° F., the boiling point of the solution under the vacuum. The concentrate is cooled, e.g. to room temperature or below, e.g. 32° F., the lactose allowed to crystallize and removed by centrifuging, filtering or other conventional technique. The resulting product is designated Solution B.

It is preferred to concentrate Fraction B to $\frac{1}{10}$ the volume since at a concentration of only $\frac{1}{5}$ the volume not as much lactose is removed and hence more diluent must be added in the subsequent operation requiring larger equipment to produce an equal amount of bread flavor.

Solution B can be employed by itself in preparing bread flavor providing it is diluted at least 1:1 with water. It can be diluted with water up to 1:20 but here again larger equipment is required to produce the same amount of bread flavor concentrate. To the water diluted Solution B there can be added lactic acid to give a pH of 3.5 to 6, preferably 4.5. Lactates such as sodium lactate and potassium lactate can also be employed.

Alternatively and preferably Solution B is diluted with Solution A. As little as 2% of Solution B can be employed with a 1:20 dilution Solution A but preferably the ratio of Solution A to Solution B is 1:1 with Solution A being a 1:10 dilution.

When Solution A is employed as the source of the lactic acid it is necessary to add an organism known to produce lactic acid from lactose. Thus there can be used *Streptococcus lactis, Lactobacillus lactis, Lactobacillus bulgaricus, Lactobacillus delbrueckii, Lactobacillus thermophilus, Lactobacillus caseii, Lactobacillus helveticus, Lactobacillus leichmannii, Streptococcus citrovorus, Streptococcus cremoris,* etc. Fermentation is allowed to take place and is normally complete in 12 to 48 hours, usually 24 hours at a favorable growing temperature which is 70 to 90° F. for all except the thermophilic organisms. The fermentation can be carried out either under static conditions or with agitation.

Rather than fermenting Solution A with appropriate lactic acid forming organisms it is also possible to simply add lactic acid or an acid acting lactate to a mixture of Solution A and Solution B.

The lactic acid containing Solution B diluted with either water or Solution A (or a mixture of water and Solution A) is then inoculated with bread flavor causing yeast organisms, e.g. yeast of the Saccharomyces group such as Saccharomyces cerevisiae or Saccharomyces unisporum. The yeast must be one that can grow on lactic acid.

The yeast is grown in the fluid medium under aerobic conditions with vigorous agitation. However, as the assimilation continues the oxygen content goes down, eventually to zero.

A constant oxygen feed is maintained during the yeast fermentation but the growth of the yeast organisms reduces the oxygen content of the media.

The product obtained is essentially water and an intense bread flavor together with yeast cells. It can be employed as such or can be further concentrated, e.g. 10 to 100 times, or it can be dried, e.g. spray dried to a stable product.

If the product is employed as a liquid bread flavor without drying the yeast cells are desirably removed by conventional techniques such as centrifuging or filtering, e.g. with a Berkfeld or Zeiss filter.

If the product is to be dried there is preferably added a bulking agent since the ferment is merely water, bread flavor and yeast cells. When a bulking agent is added there is no need to remove the yeast cells although they can be removed if desired. As the bulking agent there can be added starch, dextrin, protein, e.g. gluten soya protein, casein, sodium caseinate, skim milk, cream, whole milk, sodium caseinate or soy protein or other protein containing 5 to 10% vegetable or animal fat, e.g. cocoanut oil, corn oil, soy oil or cottonseed oil, mixtures such as flour, e.g. wheat flour, rye flour, corn meal, soya flour, etc. Any bulking agent can be employed which dries readily and retains the flavor. Fat containing bulking agents are preferred because they retain the flavor better in spray drying. The bulking agent can be added to the liquid bread flavor in an amount of 0.1% to 100% by weight of the liquid bread flavor. Since the liquid bread flavor is mostly water the addition of even a small amount of bulking agent significantly increases the bulk of the dried product. The amount of bulking agent is not critical.

The liquid and solid bread flavor concentrates prepared by the present invention can be added to bread of various types, e.g. white bread, rye bread, whole wheat bread, French bread, pumpernickel, biscuits, rolls, raisin bread, bagels, etc. They can also be employed to impart a bread flavor to non-bread foods, e.g. to rice stuffing for turkeys and other fowl, dips made from cheese or sour cream, salad dressings, etc.

Unless otherwise indicated all parts and proportions are by volume.

EXAMPLE 1

300 liters of cottage cheese whey having 6.5% total solids and 4.5% lactose were heated at 185° F. until the protein had coagulated (about 20 minutes). The coagulated protein was removed by centrifuging. The clear solution was divided into two equal parts, Fraction A and Fraction B. One part of Fraction A was diluted with 9 parts of water to give a 1:10 dilution to give Solution A.

Fraction B was concentrated under vacuum at 100–110° F. (the boiling point) to $1/10$ its original volume. The supernatant liquid was then poured off as Solution B from the residue of crystallized lactose.

EXAMPLE 2

A mixture of 1 part of Solution A with 1 part Solution B was inoculated with *Streptoccus lactis* and fermented at 32° C. (89.6° F.) for 24 hours with agitation. Then the mixture was inoculated with *Saccharomyces cerevisiae* and vigorously aerated at 85° F. for 24 hours with constant agitation. The air was introduced into the system of 0.2 cu. ft. per hour, per gallon of media. The oxygen available gradually went down to almost zero during the fermentation. The liquid product had an intense bread flavor even after the yeast was removed therefrom by filtration.

EXAMPLE 3

To 100 parts of the liquid product of Example 2 after filtration to remove the yeast there were added 20 parts of corn starch and the mixture spray dried to give a powder having the intense bread flavor carried on the starch bulking agent.

EXAMPLE 4

To 100 parts of the liquid product of Example 2 prior to filtration there were added 15 parts of whole milk and the mixture spray dried to give a powder having the intense bread flavor and yeast carried on the gluten.

EXAMPLE 5

To one part of Solution B there was added 1 part of water and the pH brought to 4.5 with lactic acid. Then the mixture was inoculated with *Saccharomyces cerevisiae* and vigorously aerated at 85° F. for 24 hours with constant agitation. The air was introduced into the system at 0.2 cu. ft. per hour per gallon of media but the oxygen gradually went to zero during the fermentation. The liquid product had an intense bread flavor. The bread flavor remained even after the yeast was removed by centrifuging.

What is claimed is:

1. In the process of preparing a synthetic bread flavor by growing yeast on a medium consisting essentially of whey and in the presence of lactic acid, wherein the whey medium has from 6% to 40% total solids therein and during the growth period the whey medium is intimately mixed with air throughout the growth period of up to 48 hours, the improvement comprising concentrating the whey medium to at least $1/5$ of its original volume, cooling the concentrate to a temperature sufficient to permit crystallization of lactose, removing the resulting crystallized lactose, diluting the concentrated whey medium with at least an equal volume of an aqueous diluent and thereafter growing the yeast on the resulting whey medium to produce said bread flavor.

2. A process according to claim 1 wherein the diluent is water and is employed in an amount of from 1 to 20 parts per part of concentrated whey medium.

3. A process according to claim 1 wherein the diluent is whey that has been diluted with water from 1:4 to 1:20 in which the lactose has been converted to lactic acid prior to addition to the concentrated whey medium.

4. A process according to claim 3 wherein the diluent is whey diluted with water to 1:10 and the concentrated whey medium has been concentrated to at least $1/10$ its original volume.

5. A process according to claim 1 wherein the concentrated whey medium is concentrated to at least $1/10$ of its original volume.

6. A process according to claim 1 wherein to the fluid bread flavor produced, there is added a bulking agent and the mixture is dried.

7. A process according to claim 6 wherein the bulking agent is selected from the group consisting of starch, dextrin and proteinaceous materials.

8. A process according to claim 7 wherein the drying is spray drying.

9. A process according to claim 6 wherein the bulking agent contains proteinaceous material together with a minor amount of fat.

References Cited

UNITED STATES PATENTS

| 2,465,870 | 3/1949 | Hanson et al. | 195—82 |
| 2,762,749 | 9/1956 | Myers et al. | 195—82 XR |
| 3,102,033 | 8/1963 | Jackel | 99—90 |

RAYMOND N. JONES, Primary Examiner

J. R. HOFFMAN, Assistant Examiner

U.S. Cl. X.R.

99—90